April 29, 1958     W. J. TURENNE     2,832,406
ANIMAL ENTRANCE OR PORTHOLE
Filed June 7, 1955

INVENTOR
WILFRED J. TURENNE
by Charles R. Fay,
ATTORNEY

۲٫۸۳۲٫۴۰۶
Patented Apr. 29, 1958

2,832,406
ANIMAL ENTRANCE OR PORTHOLE
Wilfred J. Turenne, Fayville, Mass.

Application June 7, 1955, Serial No. 513,677

2 Claims. (Cl. 160—179)

This invention relates to a new and improved animal entrance or pet porthole particularly adapted for installation in the wall of a house or other building to allow an animal to go in and out at will without attention by the owner; and the principal object of the invention resides in the provision of an entrance device as above described which may be operated by the animal and at the same time prevents the entrance of rain, snow, winds, insects, etc. and which also fails to produce any substantial disfigurement of the house.

Further objects of the invention include the provision of an animal entrance or porthole comprising a pair of open frames connected by a telescopic passageway device for installation in the outside wall of a building, with one frame interior of the inner wall and the other wall exterior of the outer wall, in combination with a series of flexible self-sustaining panels which are associated at the inner aspect of the device, these panels being provided with overlapping free edges, and together completely closing the passageway, but being of a resilient or flexible nature, the panels are capable of being deflected in either direction as the animal pushes thereon in either leaving or entering the building; and the provision of a device as above stated wherein the panels are made of an inert plastic material which cannot harm the animal in any way but which will always return to the original co-planar position closing the entrance or porthole once the animal has passed through.

Other objects and advantages of the invention will appear hereinafter.

Reference is to be had to the accompanying drawings, in which—

The present invention embodies an outer frame generally indicated at 10 and a similar like inner frame generally indicated at 12. These two frames are each provided with a large opening therein and these openings are preferably in upright elliptical form as being the most convenient to admit the usual cat or dog or similar household pet. The frames 10 and 12 are provided with telescoping members indicated respectively at 14 and 16, these members being swedged as for instance at 18 and connected to its respective open frame in any way desired.

Figure 2:
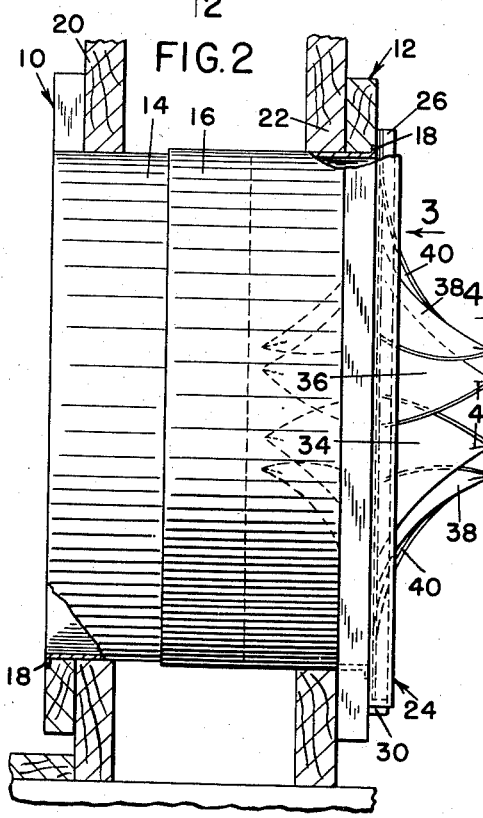
Fig. 2 is an enlarged sectional view taken on line 2—2 in Fig. 1, other parts being in section.

The members 14 and 16 are also elliptical and together form a tunnel or passageway of adjustable length so that frame 10 may be located at the outside surface of the exterior wall 20 with frame 12 located at the inside surface of interior wall 22, as clearly shown in Fig. 2. It is merely necessary to provide openings in the walls 20 and 22 to just receive the members 14 and 16, and then the frames 10 and 12 which overlap these openings, may be fixed in position by any means desired for this purpose.

The inner open frame 12 is provided with a pair of guideways generally indicated at 24 and these slidingly receive between them a third open panel 26. Panel 26 is provided with an elliptical opening corresponding with the size of the tunnel described above and it may be slid upwardly from the guides 24 to be completely removed from the device, and replaced by a like sized solid panel 28 which will then close the porthole and prevent exit or entrance of the animal. Both frames 26 and 28 may be provided with stop means 30 to locate the same in correct position when applied to the frame 12.

Figure 1:
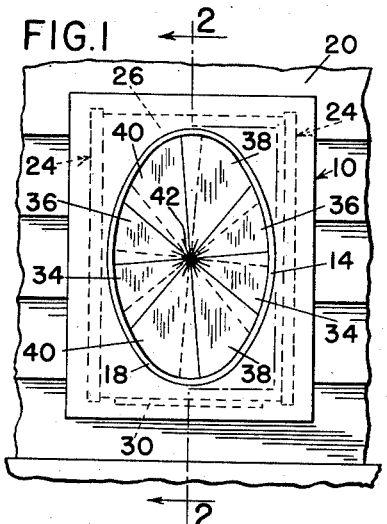
Fig. 1 is an elevational view illustrating the device applied to the exterior wall of a building.
Figure 4:
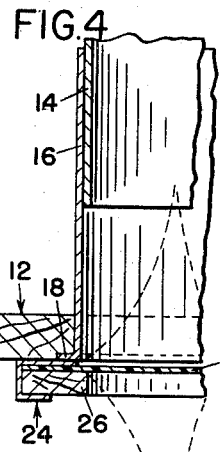
Fig. 4 is an enlarged section on line 4—4 of Fig. 3.
Figure 5:
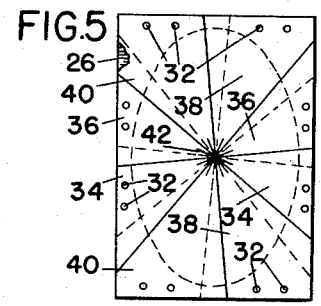
Fig. 5 is a view in elevation on a reduced scale illustrating the rear surface of the frame mounting the flexible plastic panels.
Figure 6:
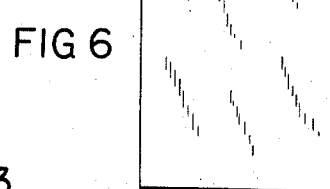
Fig. 6 is a view in elevation illustrating a solid member which may be substituted for the entrance frame.
Figure 3:
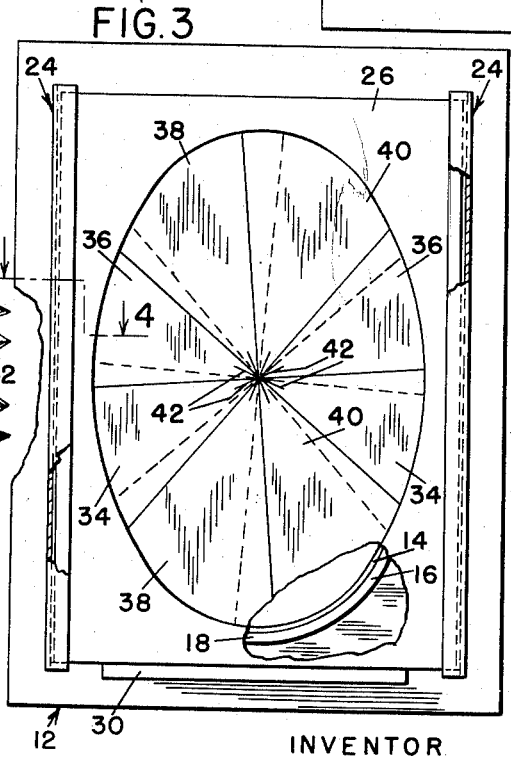
Fig. 3 is a view in rear elevation of the device, looking in the direction of arrow 3 in Fig. 2 but showing the porthole closed.

The frame 26 is provided with a series of self-sustaining plastic panels in triangular form as shown in Figs. 3 and 5. These triangular plastic panels may be secured at the rear surface of frame 26 as illustrated in Fig. 5 by fasteners of any kind as indicated at 32. Each plastic panel is provided with an apex and these apices meet centrally of the passageway (see Fig. 3) to completely close the same. Each triangular panel overlaps its adjacent panel at one edge thereof and in turn is overlapped by the next adjacent panel at the other edge, as indicated in Fig. 3, and this overlapping not only serves to maintain the device fully closed by preventing gaps at the side edges of the panels, but they assist each other in simultaneously returning to normal closed position after the animal has exerted pressure upon the device to push his way through.

By overlapping the edges, the panels always return to their original position without becoming entangled in any way, and at its apex, each triangular panel is provided with a small slit inwardly from the point thereof, thus providing two parts for each apex for carrying forwardly the idea of providing an underlying edge and an overlying edge for each triangle. This construction additionally enhances the operation of the device so that no matter in which direction the panels are deflected, they will always return to their original position without unwanted entanglement or dislodgment.

Due to the fact that the opening in this case is preferably elliptical, the triangles themselves are of different proportions. Those indicated at 34 are substantially the same; those indicated at 36 are substantially the same but reversed, and the same is true as to the pairs 38, 38 and 40, 40. The slits are indicated at 42 and it will be seen that the overlapping relationship of the panels is in the same direction about the center of the device. Clearly, other numbers of panels may be used, and sixteen panels are preferable in some cases, for added flexibility.

The operation of the animal entrance or porthole is illustrated in Fig. 2 wherein it is shown in solid lines how the flexible plastic panels will be deflected upon the passage of an aminmal from outside of the house into the house; and these same panels are illustrated in dotted lines showing the positions assumed as the animal passes from inside the house to the outside. In every case, the plastic panels return to their closed position and effectively keep out rain, wind, etc. as well as insects; but there is no hindrance to the exit and entrance of the animal. The elliptical configuration having an upright major axis of approximately twelve inches and a minor axis of eight inches, will accommodate most sizes of animals which are normally used as household pets. However, the device may of course be made in different sizes according to requirements, and the meeting point of the apices of the triangles may be differently positioned, as closer to the lower edge in large installations for continued resilience in the lower panels. The upper panels drop back straight in any event.

Strange animals, not trained to use the new entrance, will not attempt to enter, and therefore strays are not apt to cause trouble in this regard.

Having thus described my invention and the advantages thereof, I do not wish to be limited to the details herein disclosed, otherwise than as set forth in the claims, but what I claim is:

1. In a self-closing entrance, the combination of a frame defining an entrance opening, and at least three triangular resiliently flexible and normally flat panels provided in said frame and constituting a clousre for said opening, said panels having base edge portions secured to the frame and free apex portions convergent to a common point substantially at the center of said opening, said panels also having substantially triangular free side edge portions disposed in mutually overlapped relation whereby the edge portion at one side of each panel overlies the adjacent panel and the edge portion at the other side of each panel underlies the panel adjacent thereto, said overlapped side edge portions tapering in width radially inwardly from said frame and providing an operative connection between said panels whereby the same are resiliently urged one by another to their normally flat form, said closure having a single thickness of material constiututed by said panels except in regions where the side edge portions of the panels are overlapped.

2. The device as defined in claim 1 wherein the apex portions of said panels are provided with radially outwardly extending slits separating each apex portion into a pair of independently flexible apex elements.

References Cited in the file of this patent

UNITED STATES PATENTS

| | | |
|---|---|---|
| 1,535,045 | Scheidecher | Apr. 21, 1925 |
| 1,643,939 | Becker | Oct. 4, 1927 |
| 1,805,393 | Fanchier | May 12, 1931 |
| 2,560,661 | Pooney | July 17, 1951 |
| 2,699,826 | Emerson | Jan. 18, 1955 |
| 2,708,927 | Dixon et al. | May 24, 1955 |
| 2,748,854 | Lynch | June 5, 1956 |